No. 714,497. Patented Nov. 25, 1902.
C. O. MAILLOUX & W. C. GOTSHALL.
RAILWAY ELECTRIC MOTOR COOLING SYSTEM.
(Application filed Aug. 26, 1902.)

(No Model.) 8 Sheets—Sheet 1.

Fig. 1

Witnesses
Inventors
Cyprien O. Mailloux
William C. Gotshall
By Townsend & Decker
Attorneys No. 714,497. Patented Nov. 25, 1902.
C. O. MAILLOUX & W. C. GOTSHALL.
RAILWAY ELECTRIC MOTOR COOLING SYSTEM.
(Application filed Aug. 26, 1902.)
(No Model.)
8 Sheets—Sheet 4.

Fig. 4.

WITNESSES:
AB Mattingly
E. L. Lawler

INVENTORS
Cyprien O. Mailloux.
William C. Gotshall.
BY
Townsend & Decker
ATTORNEYS No. 714,497. Patented Nov. 25, 1902.
C. O. MAILLOUX & W. C. GOTSHALL.
RAILWAY ELECTRIC MOTOR COOLING SYSTEM.
(Application filed Aug. 26, 1902.)

(No Model.) 8 Sheets—Sheet 6.

Fig. 7.

WITNESSES:
A. B. Mattingly
E. L. Lawler

INVENTORS
Cyprien O. Mailloux
William C. Gotshall.
BY
Townsend & Decker
ATTORNEYS No. 714,497. Patented Nov. 25, 1902.
C. O. MAILLOUX & W. C. GOTSHALL.
RAILWAY ELECTRIC MOTOR COOLING SYSTEM.
(Application filed Aug. 26, 1902.)
(No Model.) 8 Sheets—Sheet 7.

WITNESSES:
A. B. Mattingly
E. L. Lawler

INVENTORS
Cyprien O. Mailloux.
William C. Gotshall.
BY

ATTORNEYS

No. 714,497.  
Patented Nov. 25, 1902.  
C. O. MAILLOUX & W. C. GOTSHALL.
RAILWAY ELECTRIC MOTOR COOLING SYSTEM.
(Application filed Aug. 26, 1902.)

(No Model.)  
8 Sheets—Sheet 8.

Witnesses  
Inventors  
Cyprien O. Mailloux  
William C. Gotshall  
By Townsend & Decker  
Attorneys

UNITED STATES PATENT OFFICE.

CYPRIEN O. MAILLOUX AND WILLIAM C. GOTSHALL, OF NEW YORK, N. Y.

RAILWAY ELECTRIC-MOTOR-COOLING SYSTEM.

SPECIFICATION forming part of Letters Patent No. 714,497, dated November 25, 1902.

Application filed August 26, 1902. Serial No. 121,077. (No model.)

*To all whom it may concern:*

Be it known that we, CYPRIEN O. MAILLOUX and WILLIAM C. GOTSHALL, citizens of the United States, and residents of New York, in the county of New York and State of New York, have invented a certain new and useful Railway Electric-Motor-Cooling System, of which the following is a specification.

Our invention relates to those systems of car propulsion in which the cars are driven by electric motors.

The general object of our invention is to permit the operation of trains or cars in such a system upon a shorter time-schedule than has heretofore been possible without undue increase in the weight or size of the motors.

It is well known that on electric railways where the speeds are high and the stops are frequent a short time-schedule cannot be observed without a high rate of acceleration in starting the car or train of cars from every stop. Under ordinary conditions this means either an excessive heating of the motors or an undue increase in the size and weight of the motors. Otherwise stated, high mechanical efficiency in rapid service with short time-schedule demands rapid acceleration, which in turn means an increased weight of motor or else a more wasteful acceleration.

Our invention consists in a new and useful system and apparatus whereby the cars or trains upon electric railways may be operated upon a short time-schedule without undue heating of the motors; and to this end our invention consists, broadly, in providing upon a car driven by an electric motor a suitable source of compressed air or gas on said car and means for releasing or discharging the air or gas into or upon the motor in such manner as to keep the temperature of the same down by the refrigerating or cooling effect due to the expansion of the air or gas coupled, preferably, with the heat-dissipating effect due to the circulation of the air-currents.

In carrying out our invention in its broadest aspect any desired means may be used for releasing the air or gas under pressure; but we prefer to employ a periodically-acting means or one which will come into play intermittently and either at predetermined time intervals or at intervals determined by the temperature of the motor. In some cases, and as hereinafter more particularly described, the discharge of air under pressure may be governed by a discharge-valve which will operate periodically through accumulations of air or gas pressure in a reservoir whose outlet is controlled by said valve.

Our invention, however, in its broadest aspect does not depend upon the use of any particular means for releasing the air under pressure through the outlet where it expands, and thereby produces cold or refrigeration for the purpose of cooling the motor.

It is obvious, further, that our invention is applicable either to a car or to a train of cars and that the air for refrigeration may be conducted through train-pipe couplings connecting the pipes upon the several cars, while said pipes on each car may be connected suitably with the motor or motors of that particular car, the whole forming in practice a multiple connection of the motors with the cooling-air pipe for refrigeration.

Another of the objects of our invention is to utilize the compressed air employed in any air-brake system for the additional and useful purpose of keeping down the temperature of the electric motors upon the cars to which the air-brake system is applied. Heretofore, as is well known, the compressed air used in air-brake systems after it has done its work in applying the brakes is allowed to exhaust or discharge freely into the atmosphere, in doing which it necessarily produces cold by the sudden expansion of the air under pressure, but without performing any useful function.

One of the features of our invention consists in utilizing the exhaust-air of an air-brake system upon an electrically-driven car for the purpose of keeping down the temperature of the driven electric motor used in propelling the car. This we accomplish, preferably, by running a pipe or connection of suitable character from the usual exhaust vent or pipe of the air-brake system to the electric motor, where the air is allowed to discharge into the motor-casing or upon the motor in such manner as to keep the same cool. Preferably the discharge from the air-brake system is taken into the same distributing-pipe into which a periodical discharge of air or gas under pressure is admitted by an independent operating-valve controlled in any desired manner and acting at intervals predetermined by the action of any controlling mechanism or means—such, for instance, as accumulation of air or gas pressure in a receiver or a driven mechanism continuously driven or, if need be, intermittently driven from the car-axle.

Another feature of our invention consists in the combination, with an air-brake system and means for cooling the motors of the electrically-driven car by the exhaust-air from the air-brakes, of supplemental means providing an additional refrigeration or cooling service for the electric motor and acting independently of the air-brakes.

It will be obvious that our invention admits of many modifications in the details, dependent largely upon the kind of source of compressed air and the kind of air-brake system.

Various sources of compressed air may be employed. Thus, for instance, in the so-called "air-storage" system the source of compressed air may consist merely of a large tank attached to and carried by the motor-car or locomotive and made suitable and designed and arranged for containing a sufficient quantity of compressed air at high pressure, (usually about three hundred pounds,) sufficient for a given braking service of a certain number of hours or a certain number of miles run. The said reservoir is filled periodically by being connected through suitable means with an external source or supply of compressed air. In other cases the source of supply consists of an air-compressor which is mounted on the motor-car or locomotive and which is operated by mechanical power produced by an electric or other motor or else from one of the car-axles by suitable gearing and mechanical connection. A compressor for which the driving power is supplied by an electric motor is usually termed a "motor-driven air-compressor." A compressor for which the power is obtained from the car-axle is usually termed an "axle-driven air-compressor." In either of the two latter cases the compressor simply operates to store air in a tank or reservoir, one or more, on the car, from which it is drawn as occasion requires; but our invention may be carried out in connection with any source of gas or air under pressure provided upon a car or cars of the system and made by the use of suitable controlling-valves to discharge the air under pressure in a manner to cool the motor of the car on which the source is located or on an adjoining car by the use of proper hose or pipe connections between cars.

Our invention may also be carried out in connection with any system of air-braking and is not limited to the particular system herein described, wherein the brake-control valve admits air under pressure directly to the brake-operating cylinder instead of, as in some systems, releasing the pressure in a train-pipe, so that the valve upon the car normally subjected to the pressure from said train-pipe will be relieved, so as to admit air to the brake-cylinder, our invention being also applicable to the latter systems or any modifications thereof.

In describing our invention we shall, however, assume that the brake system employed is one in which a manually-operated control-valve governs the connection directly from the source of compressed air to the brake-cylinder and we shall also assume that an air-compressor is employed upon the car and that said compressor is operated by an electric motor. We shall also describe our invention as carried out by the use of reservoirs or other source of air-supply with valves and connections, such that the supplemental cooling effects are produced by expanded air derived from the same prime source which operates the braking system, although it would be within our invention to obtain the supplemental cooling effects from an independent source of compressed air or gas.

Our invention consists also in the combinations of devices hereinafter described and then more particularly specified in the claims.

In the accompanying drawings, Fig. 3 shows in plan the truck, electric motors, and pipe connections at one end of the car.

Figure 1:
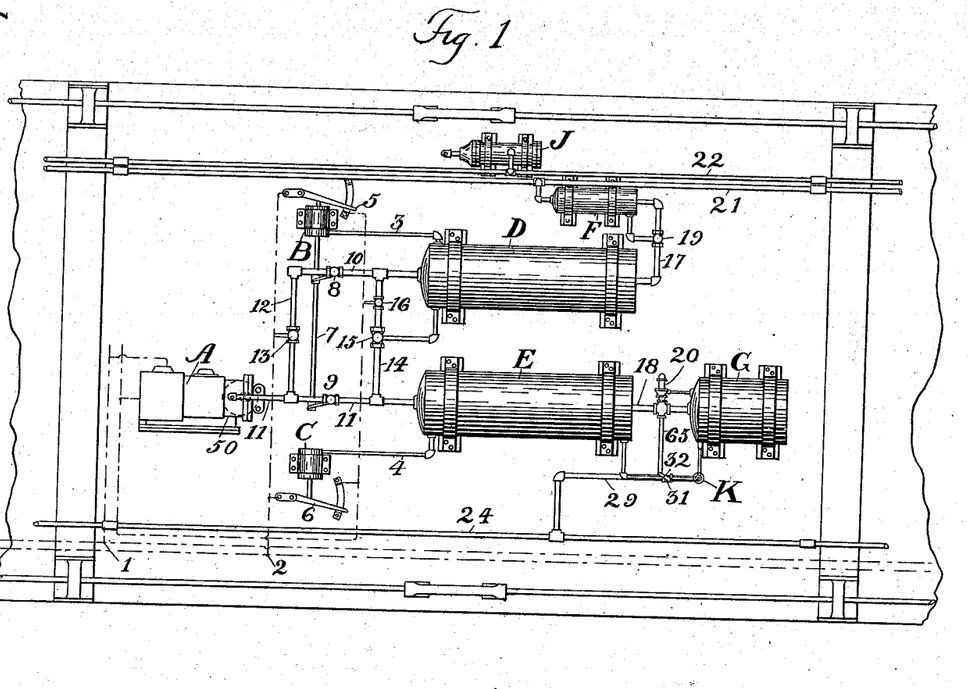
Figure 1 shows diagrammatically or in plan an arrangement of tanks or reservoir, compressor, valves, and piping suitable for use in carrying out our invention.

Referring to Fig. 1, D is the tank or reservoir supplying the braking system; J, the brake-cylinder; E, a tank or reservoir supplying air to a valve operated independently of the braking system; A, a motor-driven air-compressor on the car, and A' a supplemental motor-driven air-compressor. The compressor A is operated by current taken from any source of electricity—as, for instance, from the same source that drives the motors of the car or train. This may easily be effected by connecting the motor-circuit for the compressor, as at points 1 2, to the car-circuit from which the car-motor is fed. In the case of motor-driven air-compressor the action thereof is controlled by a special device, as well understood in the art, termed an "electric pump-governor," two of which are shown in the figure—one at B and the other at C. The governor B is connected by the air-pressure pipe 3 with air-tank D, and the electric governor C is likewise connected by the pressure-pipe 4 with the air-tank E. The governor may be constructed of any of the forms well known in the art. The design usually includes a piston moving under the influence of the air-pressure in the tank and opposed by a spring which is capable of exerting a variable and regulable counter-pressure, so that the governor will operate the switches 5 6 whenever the pressure falls down to a certain determinate pressure, so as to connect the air-compressor motor with the electric-current supply and start the air-compressor and so that it shall move in the opposite direction, thereby opening the switch and causing the air-compressor to stop whenever the pressure in the air-tanks D E shall have risen a certain determinate amount.

Figure 4:
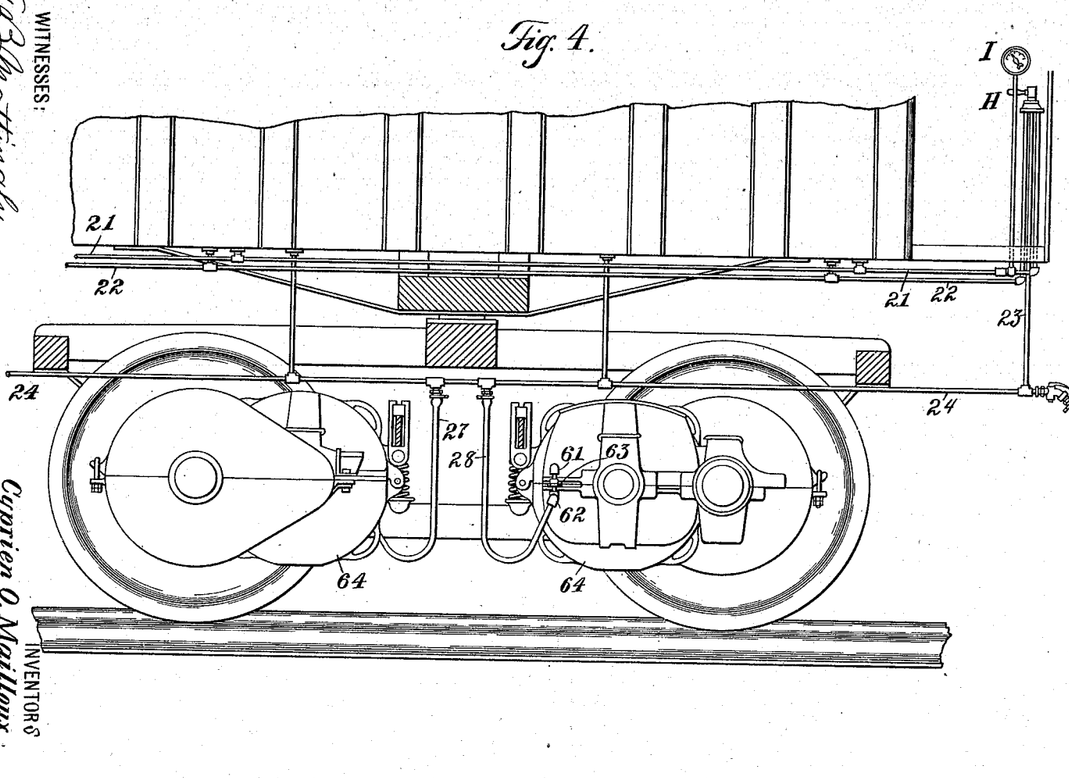
Fig. 4 shows in side elevation the apparatus at one end of the car.

In Fig. 1 one of the electric pump-governors B is arranged so as to perform an additional function by means of the rod 7, attached to the piston of the governor, which rod connects with two levers 8 9, serving to operate two stop-cocks located in the pipes 10 and 11, the stop-cocks being so arranged and so connected with the said rod 7 that when the said rod moves downward, which occurs whenever the pressure in the air-tank D falls below a certain amount, the stop-cock 8 will be opened, thereby leaving a free passage through the pipe 10 into the air-tank D, whereas, on the contrary, the stop-cock 9 will be closed, thereby preventing the passage of compressed air into the tank E. A pipe 12 is used for making a cross connection between the pipes 10 and 11, the said cross connection being controlled by a stop cock or valve 13, interposed in said cross - connecting pipe. A second cross-connecting branch 14 is interposed between the pipes 10 and 11 at a point between the stop-cocks 8 9 and the air-tanks D E. In this branch pipe 14 are interposed a pressure-reducing valve 15 and a check-valve 16, both of which are arranged so as to allow air to pass only in one direction—namely, from the air-tank E into the tank D. The pressure-regulating valve 15 is preferably regulated so as to reduce the pressure of air allowed to pass into the tank D to about one hundred pounds per square inch. The tanks D E are known as "air - storage" tanks. The air stored in the storage-tank D is conveyed into the auxiliary tank F through the pipe 17 and the pressure-reducing valve 19, while the air from the storage-tank E is in like manner conveyed through the pipe 18 and the pressure-reducing valve 20 to the auxiliary tank G. The air-storage tank D and auxiliary tank F constitute an outfit and equipment such as is commonly used for the air-brake service. The auxiliary tank F connects with the air-pressure pipe 21, which conveys the air-pressure to the controlling-valves H H and to the pressure-gages I I, one located at each end of the car, as seen in Figs. 3 and 4. By the proper manipulation of this valve the air-pressure may be sent into the pipe 22, which connects with the brake-cylinder J, by the operation of which the pressure is transmitted and applied to the brake-shoes through suitable mechanisms well known in the art and not herein shown.

An air - brake equipment, as shown, provides for setting the brakes only on the car on which the valve H is located. For train service the pipes 21 22, running through the car from end to end thereof, would be provided, preferably, with the usual air-brake couplings, so that and as well understood in the art the tanks F on the several cars would all feed into pipe 21 in multiple and the operation of valve H on any car would admit pressure from said pipe 21 into pipe 22, which, coupled as a train-pipe, would feed all the air-brake cylinders J on the train in multiple, thus supplying the brakes on all the cars at once.

Figure 5:
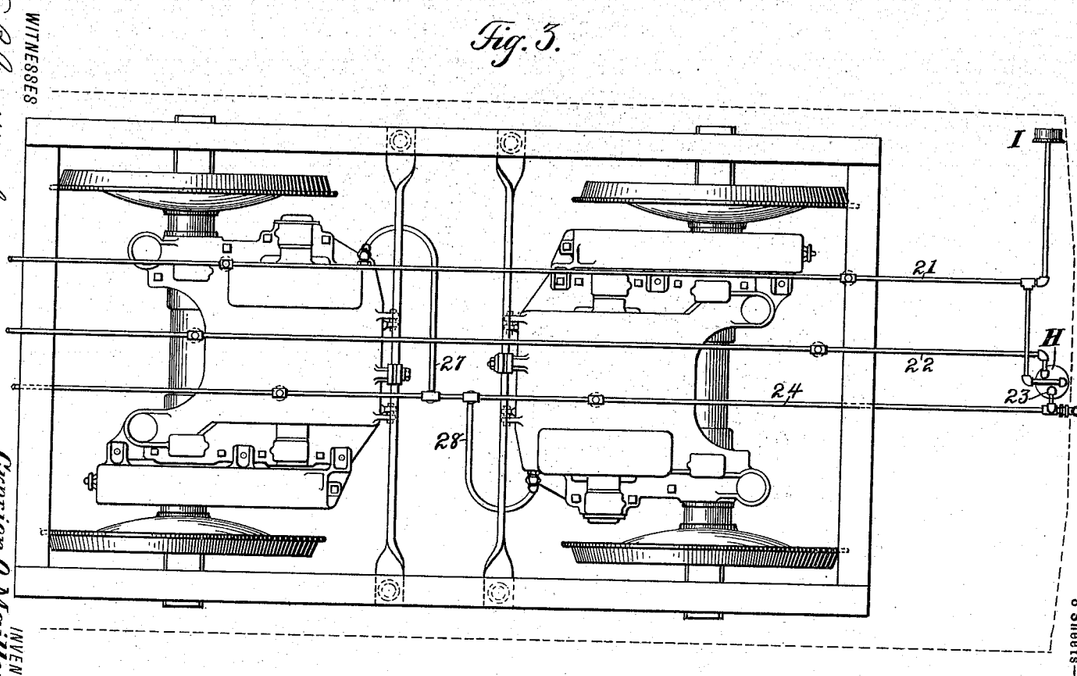
Fig. 5 shows in plan a form of motor with its casing opened to show the arrangement of pipes within the same for delivering the cooling-air.
Figures 5, 6:
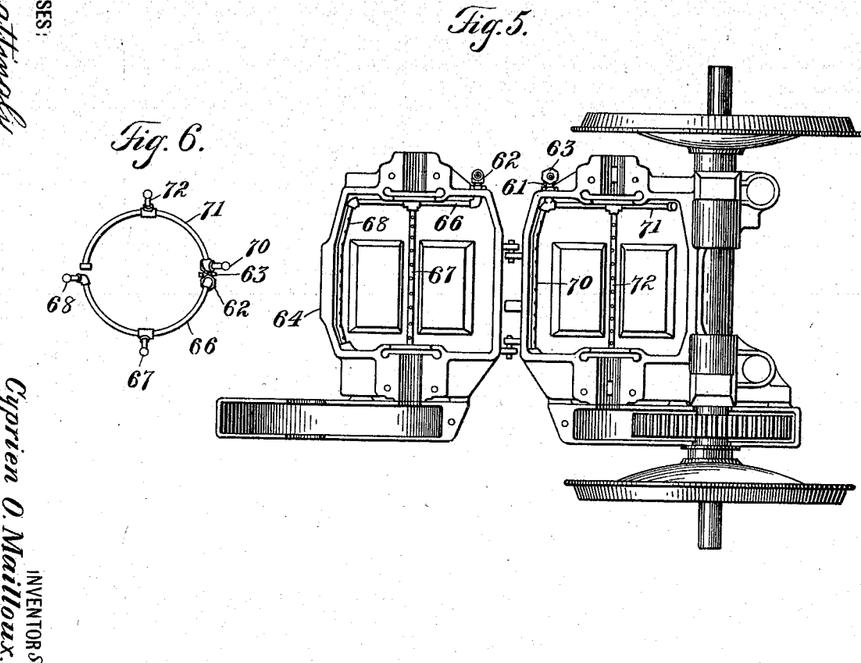
Fig. 6 is an elevation of the piping in one end of the motor-casing.

Hitherto it has been the practice to release the brakes by moving the control-valve H so as to make connection through the said valve between the pressure-pipe 22, conveying the compressed-air supply to the brake-cylinder J, and the release or exhaust pipe 23, which opens to the atmosphere. A feature of our invention consists in prolonging said release or exhaust pipe so as to make it discharge the exhaust-air into or upon the motor. By preference we accomplish this by connecting the exhaust 23 with a pipe 24, running from end to end of the car in the case of a double-truck car and through the entire length of a train in the case of a train consisting of two or more motor - cars. Instead of allowing the compressed air discharged from the brake-cylinder J at the time that the brakes are taken off to be released and to be allowed to expand into the open air the said compressed air is sent through the exhaust-pipes 23 into the exhaust-main 24. The said exhaust-pipe has connected thereto flexible or other pipes 27 28, which make a T connection with the said exhaust-main at points suitable and convenient for each of the electric-car motors. The said flexible connection is brought through and into the motor-case through a suitable opening and is made of sufficient and proper length, so as to reach to a convenient point inside of the motor-case. Instead of bringing the pipe itself into the motor-opening we may bring the flexible portion of the pipe to a convenient point, at which a coupling is provided, which coupling forms the outward end of one or more metal pipes, forming a special outfit, which pass into the case of the motor and terminate therein at convenient points, one or more. The form will depend on the particular motors used. One manner in which the pipes may be disposed within the motor-casing is indicated in Figs. 5 and 6. The couplings to which the pipes 27 28 connect are indicated at 62 63. These are joined one with a curved pipe 66, disposed in the head of the casing and in the upper portion thereof, and the other with a similar curved pipe 71 in the lower portion thereof. Extending axially through the casing and joined to the pipes 66 71 by suitable couplings are the perforated pipes 67 68 70 72, which are perforated to allow free egress of air and to distribute the air through the space within the casing and into contacts with the parts of the motor which are most liable to heating. The compressed air upon being let out of the brake-cylinder by the proper manipulation of the control-valve H passes through the exhaust-pipe 23 into the exhaust-main 24 and thence into the branch pipes 27 28, connecting with the couplings of the cooling and ventilating pipes aforesaid within the casing. The air passing through said pipes 27 28 and said couplings enters the case of the motor and issues from the openings in the ventilating-pipes and is distributed throughout the free spaces inside the motor-case, thereby causing a rapid circulation of air. This air being chilled as the result of its expansion acts as a cooling agent in a much more effective manner than could be accomplished by means of the ambient air.

The air-storage tank E and the auxiliary tank G serve for the purpose of providing additional cooling connection at regular or periodical intervals in case the same be required, so as to supplement the cooling effect of the compressed air discharged from the brake-cylinders J consequent upon and resulting from the regular brake service. It is to be understood, however, that it would be within our invention to dispense with the cooling effect of expanded air obtained from the exhaust of the air-brake system and to depend entirely upon the cooling effect obtained from compressed air discharged at regular, irregular, or periodical intervals by means of a valve actuated or controlled independently of the brake system. This would be done in the case of motor-cars using an electric brake or some brake system not requiring the use of compressed air.

The cooling effect obtained from air stored in tank E and auxiliary tank G, if the latter be used, is controlled through any suitable valve, (indicated at K,) which may be a valve adapted to be opened and closed periodically or at any desired intervals and dependent for its operation upon any kind of control. This device K might be a valve adapted to automatically release through accumulation of pressure in the tank G behind it. Thus, for instance, the device K may consist of a pressure-regulating valve of the kind known in the art as a "snifting-valve," such as used for releasing excessive pressure in the receivers of compound engines, it being arranged in this case in such manner that the pressure released instead of being discharged into the outer air is sent into the pipe 29, which connects with the exhaust-main 24.

The operation of the system as outlined in Fig. 1 is as follows: The pressure-regulating valves 19 and 20 are both set so as to allow air to pass into the auxiliary tanks F and G at a suitable pressure—as, for instance, one varying from seventy to ninety pounds. The pressure-regulating valve 15 and the electric pump-governor B may be both adjusted for a pressure of about one hundred pounds in the air-storage tank D, serving for the air-brake system. The electric governor C is adjusted for a pressure of about one hundred and twenty-five pounds. The electric connections of the pump-governors B C are such that the electric motor operating the air-compressor A will continue to operate so long as the operating-circuit remains closed by either of the two at the points 5 and 6, respectively. When the pressure is down in both the tanks D and E and when both the electric pump-governors make contacts at the points 5 and 6, the stop-cocks 8 and 9 are in such position that the supply of compressed air from the source A can only pass into the air-tank D through the pipes 11, 12, and 10, the stop-cock or valve 13 being always fully opened so long as only one compressor is used for the entire service, including the brake-service and cooling service. Under those conditions the air-tank D being the only one in which compressed air is sent will be the first one in which the pressure will rise. When the pressure rises to one hundred pounds or thereabout, the electric pump-governor B will operate so as to open the motor-circuit at 5, and its operation will also cause the stop-cocks 8 and 9 to be operated so as to close air connection at 8 and open it at 9, whereby the supply of compressed air will now be sent into the air-storage tank E until the pressure in said tank rises to one hundred and twenty-five pounds or thereabout, at which time the electric governor C will operate so as to open the motor-circuit at 6, thereby stopping the electric motor driving the compressor A. The auxiliary tank F, serving for the brake service, will be automatically charged by air passing through the pressure-reducing valve 19 until the pressure in said auxiliary tank attains the amount for which the said pressure-regulating valve 19 has been set, usually about eighty pounds. In like manner the pressure in the auxiliary tank G, serving for the cooling system, will be automatically regulated and maintained by the operation of the pressure-reducing valve 20. Whenever the pressure of the auxiliary tank F is reduced by the use and operation of the air-brakes, this pressure will again be maintained by an additional air-supply obtained from the storage-tank D. When after repeated operations and use of the air-brake the pressure in storage-tank D has become reduced below the required amount, there are two ways in which the pressure may be automatically raised—namely, first, by air passing from the storage-tank E, which has higher pressure, into the storage-tank D through the pressure-reducing valve 15 and the check-valve 16; second, by the operation of the electric pump-governor B, which causes the motor-compressor to start. The arrangements are such that under no circumstances can air be passed from the storage-tank D into the storage-tank E, not only because the normal pressure maintained in tank E is higher, but also on account of pressure-reducing valve 15 and check-valve 16, both of which would evidently prevent such passage from the storage-tank D into E. The air from the tank G, which is destined to be used exclusively for cooling purposes, is automatically discharged at certain intervals into the pipe 29 and thence into the exhaust-main 24 by means of the device K. This device K may be set so as to open at a pressure approximately equal to but slightly below the pressure for which the pressure-regulating valve 20 is set. The result is that when the pressure in the tank G reaches the normal pressure for which the valve 20 is set the automatic release device K will operate and cause the pressure in G to be immediately reduced by a discharge of air through the pipe 29 into the exhaust-main 24 and thence through the branch pipes 27 28 into the motor-cases, just as in the case of the compressed air discharged from the brake-cylinders J through the controlling-valves H in the normal operation of the air-brake system. The device K is set so as to automatically close as soon as the pressure in the tank G has been reduced to a certain point. The pressure then goes on accumulating in the tank G by air derived from the storage-tank E through the pressure-valve 20 until the pressure in the tank G again reaches the original normal pressure, whereupon the device K again operates so as to reduce the pressure, as before. In this manner a periodical discharge of compressed air from G into the exhaust-main 24 will be obtained. The frequency of the discharge will be regulated by adjusting the upper and lower limits of the pressures to which the device K responds and also by other means, such as the total area or orifice or total discharge-opening through the said device K. We do not limit ourselves, however, to operating the valve K periodically by accumulation of pressure in G, since it may be controlled in its action by any controlling device acting independently of pressures in the air-supply, and we have in our application for patent executed August 9, 1902, and filed October 6, 1902, Serial No. 126,129, described means for operating the valve periodically from a constantly-operating controlling-motor or equivalent device, and in our application for patent executed August 9, 1902, and filed September 13, 1902, Serial No. 123,226, we have set out a manner of governing its action by the temperature condition in the motor itself through the controlling action of a thermostat connected with the motor and governing the circuit of the magnet which operates the valve.

The special means shown in the applications constitute some of the ways in which the valve K may be controlled to periodically discharge the compressed air in accordance with the broad invention herein claimed.

Figures 8, 9:
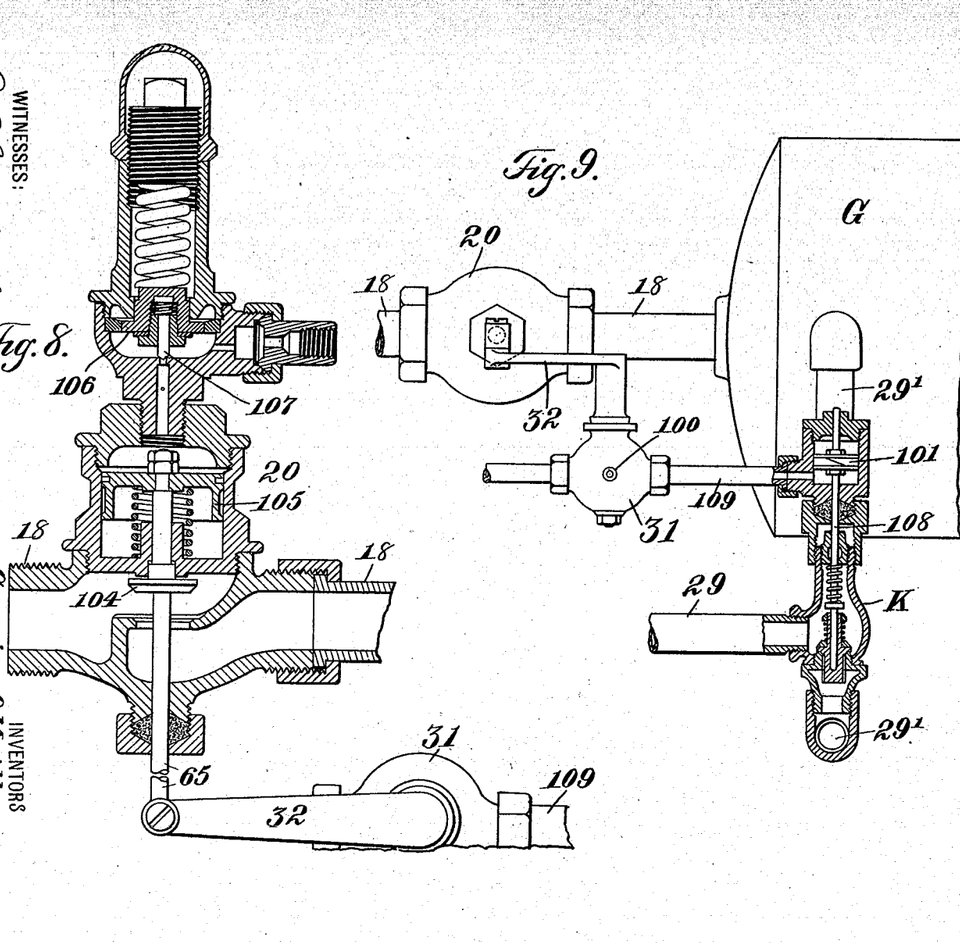
Figs. 8 and 9 show details of the apparatus in longitudinal section and partial elevation.

When the valve K is operated by accumulation of pressure, we prefer to employ in addition to the devices described a by-pass connection 30 from tank E to a piston adapted to operate valve K. A suitable valve 31, normally closed, is connected by arm 32 and rod 65 with the stem of the pressure-reducing valve 20. These parts are so combined that when the pressure in G has reached the limit determined by the setting of the pressure-reducing valve said valve will open the valve 31 and allow the higher pressure in tank E to be gradually applied direct to the piston-operating valve K, thus insuring the action of the latter should it fail to open under the lower pressure admitted to tank G by the pressure-reducing valve 20. These parts are shown in detail in Figs. 8 and 9. The pressure-reducing valve shown in Fig. 8 in vertical section comprises the usual differential pistons 104 and 105, the former of which controls the direct passage from 18 to tank G, while the latter, which is of larger area, closes the valve 104 by the back pressure from the tank G, which is admitted through a separate pipe to the cylinder of piston 105 by the action of a piston 106, which is connected to valve 107 and is adjusted in the usual way to respond to the back pressure when the same reaches the point to which the spring acting against piston 106 is adjusted. These parts as shown and so far described are an approved pattern of pressure-reducing valve. The stem of the valves 105 104 is simply extended through a stuffing-box in the bottom of the valve-casting, as shown, to connect with or constitute the rod 65, before referred to.

The valve K (shown in Fig. 9 in vertical section and controlling the connection from tank G by pipe 29' to pipe 29) may be of the usual construction, as shown, but has its valve-stem 108 extended through its top to connect with a piston 101, working in a cylinder fastened to the top of valve K and connected with valve 31 by pipe 109, through which the pressure is admitted beneath piston 101 to lift the piston and open the valve K. Valve 31 should be of the usual type adapted to permit the pressure in pipe 109 to exhaust through a port 100 when the valve 31 closes to shut off the pressure in pipe 18. After the discharge through valve K and consequent reduction of pressure in G the valve 20 will close valve 31, and pressure will then go on accumulating in G until the valve K again discharges the air from G by the normal pressure accumulated therein or by the higher pressure admitted through 31 in case the valve should fail to "pop" under the pressure from G.

Figure 10:
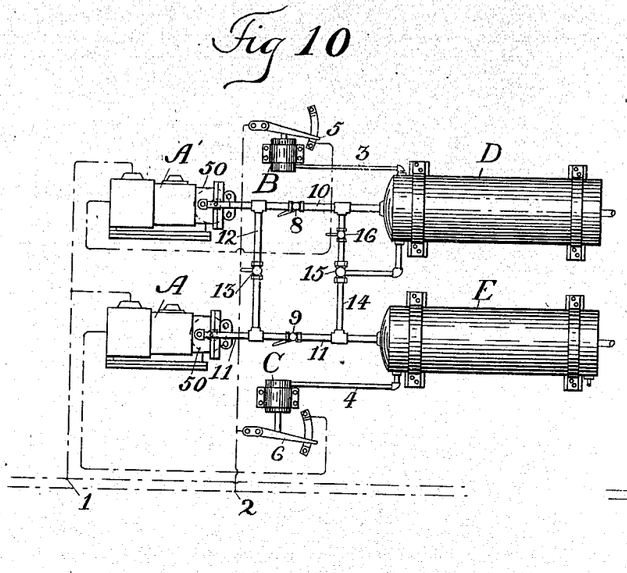
Figs. 10 and 11 illustrate modified arrangements of the apparatus.
Figure 11:
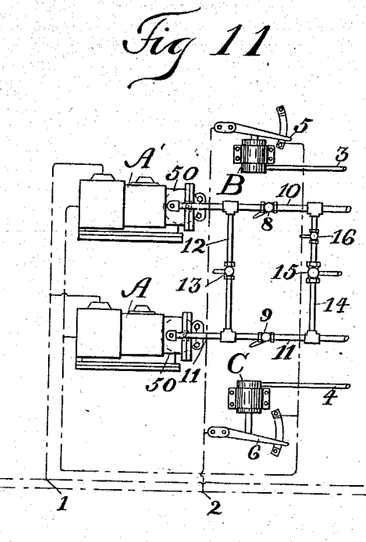

As illustrated in Fig. 10, the arrangement shown in Fig. 1 is capable of modification by the addition of a second source of compressed air A', which may be operated and controlled independently of the compressor A, so as to make two systems distinct and independent of each other, one having compressor A', serving entirely for the air-brake service, and the other compressor A, serving almost wholly for the cooling service. The connections of the circuit-controllers for the pressure-regulator and the motors controlled for the pressure-regulator and the motors controlled thereby should be, as shown, such that each regulator may control the operation of its own motor only and independently of the operation of the other. Under these circumstances the cut-off valve 13 would be closed entirely and the rod 7 be disconnected or dispensed with, while the stop-cocks 8 and 9 would be both left fully opened. If then the compressor A', serving for the air-brake service, should fail, the supply of air in the storage-tank D could still be furnished from the cooling-service system by air passing from the storage-tank E through the pressure-reducing valve, as already explained. The controllers and motors might be connected in the particular way shown in Fig. 11. In this case the valve 13 should preferably be left open, the rod 7 being disconnected and the valves 8 9 being also opened, as already stated. In this instance the two motors do not operate independently, but operate jointly to restore the pressure in either or both compressor-tanks, as occasion requires.

Figure 7:
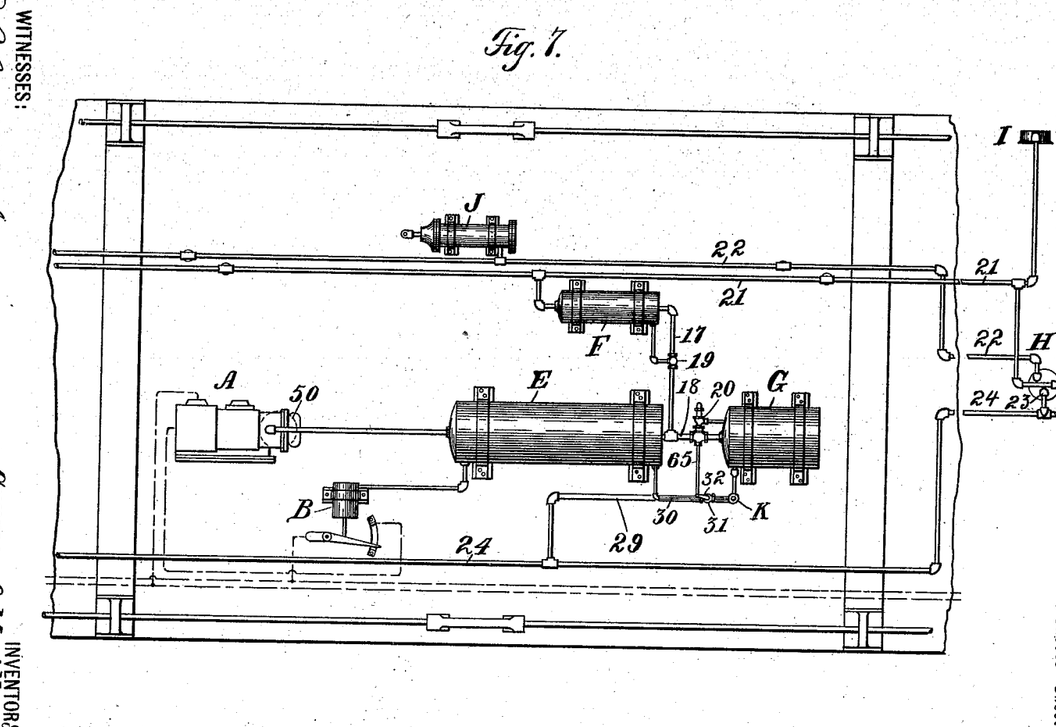
Fig. 7 illustrates a modified arrangement of apparatus whereby the braking system is supplied from the same air tank or reservoir from which air is taken through an independently-operating valve acting periodically or at intervals of greater or less duration for the purpose of keeping down the temperature of the motor.

Fig. 7 shows a simplified arrangement in which the storage-tank E is used for both the air-brake and the cooling service. In this case there is only one compressor A, operated by a single electric governor B. The pressure in the storage-tank E may be made either one hundred or one hundred and twenty-five pounds per square inch. The two auxiliary tanks F and G in this case both derive their supply from the same storage-tank through the pressure-regulating valves 19 and 20, as before. The connections from these tanks to the air-brake system and cooling system, respectively, are the same as before. The operation of the system for air-brake service and for cooling service is substantially the same as before.

In case that the source of compressed air A should be an axle-driven air-compressor instead of an electric-motor-driven compressor the operation would still be substantially the same. The electric pump-governor in this case would be replaced by a different form of governor operating in such manner as to control the valves in the air-compressing cylinder of the air-compressor, whereby the air would be compressed and sent into the storage-tank so long as the pressure in said tank remained below the point at which the regulator is set, after which the air-compressor would operate without compressing or storing air, but merely to move the air back and forth through a by-pass connection. In the case of the so-called "air-storage system," in which the air-compressing is not done on the car itself, the source A would consist of a storage-tank containing a supply of air at higher pressure than either of the storage-tanks D or E, as already explained, the connection between the source A and the said storage-tanks being made in this case through a pressure-reducing valve substantially the same as the valves between the storage and auxiliary tanks, but set so as to produce the desired drop and pressure in the compressed air transferred from the source A to the storage-tank D. In either of these two cases the operation of the system in all other respects would be the same as described for and with reference to the systems shown in Figs. 1 and 7.

The details of the invention may be greatly modified without departing from the spirit of the invention. The dimensions of the storage and auxiliary air-tanks are to be varied in each particular case according to the character and amount of service required both for the air-brake service and the motor-cooling service. We do not confine ourselves to any specific proportions or to any specific kind and arrangement of pressure controlling and regulating appliances. These appliances already exist in the market in various forms and all of them are more or less suitable for our purpose. In practice it may be desirable to adapt and select and adopt certain kinds for certain purposes in preference to others.

While we have described the use of a connection from the pressure-reducing valve 20 to operate a valve 31, and thereby put additional pressure on valve K to insure the operation of the same, we do not limit ourselves to any special means for opening a high-pressure connection to the valve K, but may employ any means for periodically or intermittently or at any desired intervals subjecting said valve to a higher pressure than that for which the reducing-valve 20 is set by actuating a valve 31, suitably located to control the passage of air from a source of higher pressure than that in the tank or passages immediately connected with said valve K. It is also obvious that any desired power might be periodically applied for operating the valve K independently of the pressure accumulated in tank E for the purpose of insuring its operation. It will be obvious also that our invention is of utility in those systems where it is proposed by turning the electric motor into a generator to utilize said motor as a braking appliance and at the same time to recover as electric energy the energy expended in bringing the car or train of cars to a stop, for the reason that in such case the motor is subjected to additional heating, which renders artificial cooling indispensible unless the schedule time be lengthened.

In order that injury to the motors from the moisture in the air used for cooling them may be avoided and to which they would be particularly liable in cold weather when the compressor is located on the car and takes in air at a low temperature, we provide, in connection with the compressor and reservoir, suitable means for removing the moisture from the air before it passes to the storage tank or reservoir, from which it is delivered directly to the motor through valve K or other device. For this purpose we may use an air-drier composed of a suitable receptacle containing chlorid of calcium or other drying agent and provided with inlet and exit ducts, through which the air is passed on its way from the compressor to the storage tank or reservoir and caused to circulate through the drying agent.

Figure 2:
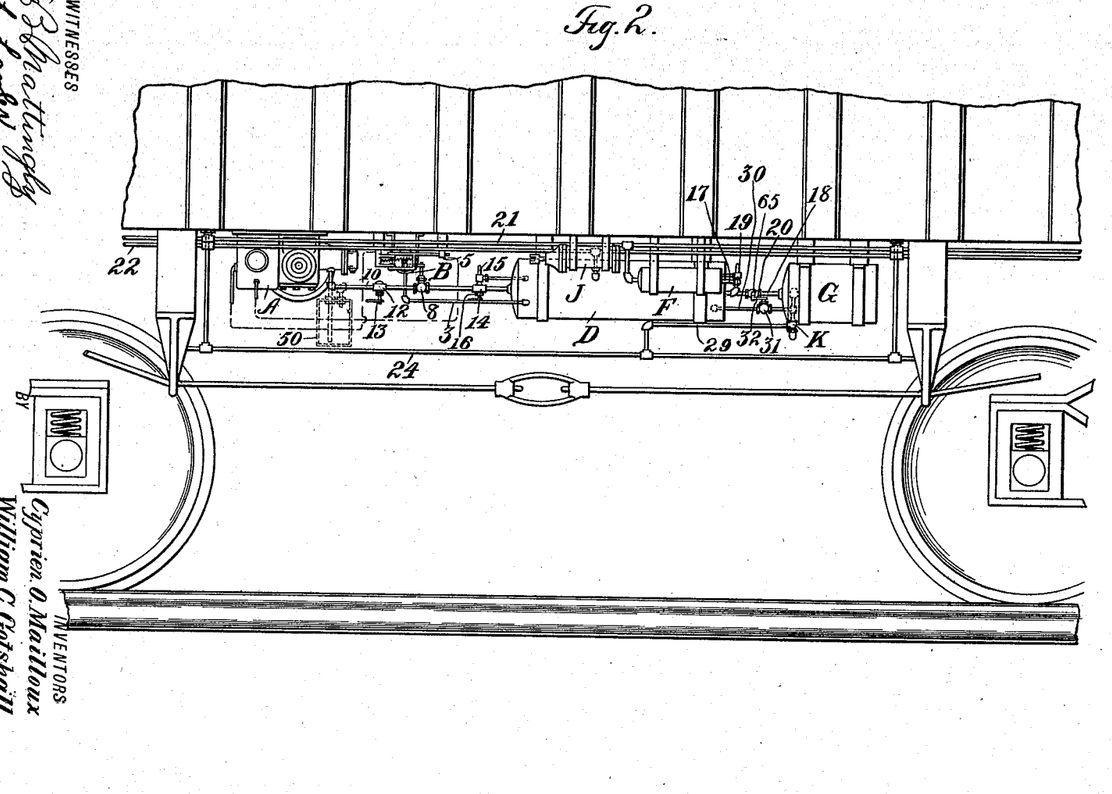
Fig. 2 shows a side elevation of the same apparatus as located at or about the center of the space beneath the car-body.

In Figs. 1 and 2 an air-drier 50 is indicated in dotted lines connected to the pipe 10. It might obviously be located at other points in the passages from the outside atmosphere to the tank or reservoir.

We claim as our invention—

1. The combination with an electric-railway motor, of a source of compressed air or gas upon the car or train of cars propelled by said motor and means for releasing and discharging the air into or upon the motor to keep the temperature of the same down by the refrigerating or cooling effect due to expansion of the air, as and for the purpose described.

2. In a system of electrical propulsion for railways, the combination with a propelling electric motor for the car or train of cars, of a source of compressed air upon the train, and means for periodically releasing and discharging the air into or upon the motor, as and for the purpose described.

3. The combination with an electric-railway motor, of a tank or reservoir of compressed air upon the car or train of cars propelled by said motor, air pipes or connections leading from said reservoir to the motor, and a valve controlling the passage of the air from said reservoir to the motor.

4. The combination with an electrically-propelled car and the motors therefor, of a reservoir or source of compressed air upon the car, a suitable distributing-pipe, a pipe leading from the reservoir to said pipe, a valve in the pipe leading from said reservoir to the said distributing-pipe and branches from said distributing-pipe to the electric motors.

5. In an electric-railway system, the combination with the cars and their propelling electric motors, of pipes upon the several cars provided with couplings for connecting them up into a train-pipe, branches from the pipe on each car leading to the motor-casings of the motor thereon, and one or more reservoirs or sources of compressed air upon the train connected with said pipe through pipes or passages containing a discharge or relief valve, as and for the purpose described.

6. The combination with an electric-railway motor and an air-brake equipment for the car or train of cars propelled by said motor, of means for conveying the exhaust-air of the brake-equipment to the electric motor, as and for the purpose described.

7. The combination with an electric-railway motor and a source of compressed air upon the car or train of cars propelled by said motors, of an air-brake valve controlling the connection from said source to a pipe adapted to deliver air into or upon the motor.

8. The combination with an electric-railway motor, of a source of compressed air upon the car or train of cars, a brake-valve controlling the admission of air to the brake-cylinder, and an exhaust from said brake-valve connected with the electric motor.

9. In an electric-railway motor, the combination of a motor-casing, an internal set of air-distributing pipes connected with a relief or release valve controlling the passage of air to said system, and pipes from a suitable compressed-air source carried by a car propelled by said motor.

10. In an electric-railway system, the combination with an air-brake equipment, of means for delivering the exhaust of the same into or upon the motor, and supplemental means for releasing and discharging compressed air into or upon the motor independently of the operation of the brakes.

11. The combination with an electric-railway motor and a source of compressed air upon a car propelled thereby, of a discharge-valve controlling the connection between said source and the motor and operating periodically through accumulation of pressure in the source.

12. The combination substantially as described, of a source of compressed air, a tank or reservoir into which the same passes through a reducing-valve, an automatic discharge-valve controlling the connection from said tank to a pipe leading to the electric motor and operating periodically through accumulation of pressure in said tank, a by-pass valve through which air from the source may be delivered direct to said discharge-valve, and means connected with the reducing-valve for opening the by-pass valve when the pressure in the tank reaches a predetermined amount thereby insuring the final operation of the discharge-valve in case the tank-pressure should be insufficient to operate the same.

13. The combination substantially as described with the air-brake system and the reservoir therefor containing air at a suitable pressure, of a supplemental reservoir supplying air at a higher pressure independently of the air-brake system, and a reducing-valve and connections whereby the latter tank may reinforce pressure in the former, as and for the purpose described.

14. The combination substantially as described with the tank or reservoir of compressed air supplying the brake system, of a tank or reservoir supplying air at a higher pressure independently of the former, a motor-driven compressor, a regulator or controller responsive to variations of pressure in the air-brake reservoir for starting and stopping the motor, valves between said compressor and said reservoir, and means for closing the valve to the air-brake tank and simultaneously opening that to the supplemental tank when the pressure in the former tank reaches a predetermined amount.

15. The combination substantially as described with the tank or reservoir of compressed air supplying the brake system, of a tank or reservoir supplying air at a higher pressure independently of the former, a motor-driven compressor, a regulator or controller responsive to variations of pressure in the air-brake reservoir for starting and stopping the motor, valves between said compressor and said reservoirs, means for closing the valve to the air-brake tank and simultaneously opening that to the air-brake tank when the pressure in the former tank reaches a predetermined amount, and a regulator or governor responsive to changes in the pressure of the supplemental tank for finally cutting out the motor when the pressure reaches a predetermined amount in the said supplemental tank.

16. In an electric-railway system, the combination with each car and the electric motors thereon, of a pipe 24, a branch therefrom leading to the motor or motors of the car, couplings for connecting the pipes 24 on various cars in series, an air-brake control-valve 4, one or more, on each car and a connection from the exhaust port or portion of each said valve to the pipe 24, as and for the purpose described.

17. The combination in an electric-railway system, of an air-pipe 24 on each car connected by a branch or branches with the electric motors of said car, couplings for uniting the pipes 24 of the cars into a train-pipe, and a connection to said pipe on each car from the air-brake system thereof adapted to deliver the exhaust-air for said system into said pipe 24.

18. The combination with an electric-railway motor and a source of compressed air carried by a car driven by said motor, of pipes and connections for releasing and discharging the air from said source into or upon the motor, a valve controlling the connection from the reservoir to the motor, and a continually-operating motor governing the action of said valve and adapted to cause the same to periodically discharge air from the reservoir into the pipe leading to the motor.

19. The combination with an electric-railway motor, of a source of compressed air upon a car of the train, means for releasing and discharging the compressed air upon the motor, an air-compressor upon the car for furnishing air under pressure to the tank or reservoir, and an air-drier through which the air is caused to pass before reaching the tank or reservoir.

20. The combination with an electric-railway motor, of an air-brake system operating by compressed air, and means for cooling the motor by the exhaust-air from the air-brake system.

Signed at New York, in the county of New York and State of New York, this 1st day of August, A. D. 1902.

CYPRIEN O. MAILLOUX.
WILLIAM C. GOTSHALL.

Witnesses:
JOHN R. GILLESPIE,
WILLIS H. HEATH.